(12) United States Patent
Jang (10) Patent No.: US 12,436,358 B2
(45) Date of Patent: Oct. 7, 2025

(54) LENS ACTUATOR AND A CAMERA MODULE INCLUDING THE SAME

(71) Applicant: LG INNOTEK CO., LTD., Seoul (KR)

(72) Inventor: Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1031 days.

(21) Appl. No.: 17/265,064

(22) PCT Filed: Jul. 31, 2019

(86) PCT No.: PCT/KR2019/009567
§ 371 (c)(1),
(2) Date: Feb. 1, 2021

(87) PCT Pub. No.: WO2020/027588
PCT Pub. Date: Feb. 6, 2020

(65) Prior Publication Data
US 2021/0302687 A1    Sep. 30, 2021

(30) Foreign Application Priority Data

Aug. 2, 2018   (KR) .................. 10-2018-0090338

(51) Int. Cl.
*G02B 7/04* (2021.01)
*G02B 13/00* (2006.01)
(52) U.S. Cl.
CPC ............. *G02B 7/04* (2013.01); *G02B 13/009* (2013.01)

(58) Field of Classification Search
CPC .......... G02B 7/04; G02B 7/021; G02B 7/023; G02B 7/02; G02B 7/08; G02B 7/09;
(Continued)

(56) References Cited

U.S. PATENT DOCUMENTS 7,724,449 B2   5/2010   Takei et al.
8,254,046 B2   8/2012   Lim
(Continued)

FOREIGN PATENT DOCUMENTS

| CN | 101435906 A | 5/2009 |
| CN | 101860163 A | 10/2010 |

(Continued)

OTHER PUBLICATIONS

Machine translation of KR-20140081275-A (Year: 2014).*
(Continued)

*Primary Examiner* — Cara E Rakowski
(74) *Attorney, Agent, or Firm* — Birch, Stewart, Kolasch & Birch, LLP (57) ABSTRACT

A lens actuator includes a base; a guide rail coupled to the base; a first lens assembly including a lens group and moving in an optical axis direction along the guide rail; a first magnet disposed on one side of the first lens assembly; and a first coil unit spaced apart from the first magnet and disposed on the base. The guide rail may include a first stopper of the first lens assembly at one end. The first stopper may limit movement of the first lens assembly. The material of the first stopper of the guide rail may be different from the material of the base.

11 Claims, 10 Drawing Sheets

(58) Field of Classification Search
CPC .......... G02B 7/102; H02K 41/00; G03B 5/02; G03B 17/12; G03B 30/00; G03B 2205/0069; H04N 23/54; H04N 23/687
See application file for complete search history.

(56) References Cited

U.S. PATENT DOCUMENTS

| | | | |
|---|---|---|---|
| 8,368,255 B2 | 2/2013 | Park et al. | |
| 8,531,063 B2 | 9/2013 | Lee et al. | |
| 8,896,711 B2 | 11/2014 | Akutsu et al. | |
| 8,922,862 B2 | 12/2014 | Honda et al. | |
| 10,488,631 B2 | 11/2019 | Bachar et al. | |
| 10,520,699 B2 | 12/2019 | Park et al. | |
| 11,099,350 B2 | 8/2021 | Park et al. | |
| 12,332,498 B2 | 6/2025 | Park et al. | |
| 2008/0186601 A1 | 8/2008 | Honma | |
| 2010/0259113 A1 | 10/2010 | Lee et al. | |
| 2011/0116180 A1 | 5/2011 | Lim | |
| 2011/0121666 A1 | 5/2011 | Park et al. | |
| 2013/0063799 A1 | 3/2013 | Honda et al. | |
| 2013/0088607 A1 | 4/2013 | Akutsu et al. | |
| 2014/0028904 A1 | 1/2014 | Kang et al. | |
| 2016/0209672 A1 | 7/2016 | Park et al. | |
| 2016/0341975 A1 | 11/2016 | Kim et al. | |
| 2017/0139225 A1 | 5/2017 | Lim | |
| 2018/0364450 A1* | 12/2018 | Lee | H04N 23/55 |
| 2018/0367714 A1* | 12/2018 | Im | H04N 23/687 |
| 2020/0081219 A1 | 3/2020 | Park et al. | |
| 2021/0231904 A1* | 7/2021 | Son | G02B 7/023 |
| 2021/0349283 A1 | 11/2021 | Park et al. | |
| 2022/0171157 A1* | 6/2022 | Roh | G03B 30/00 |

FOREIGN PATENT DOCUMENTS

| | | | | |
|---|---|---|---|---|
| CN | 102073194 A | | 5/2011 | |
| CN | 102075056 A | | 5/2011 | |
| CN | 102834765 A | | 12/2012 | |
| CN | 103034017 A | | 4/2013 | |
| CN | 105807537 A | | 7/2016 | |
| CN | 208294052 U | | 6/2017 | |
| CN | 206450888 U | * | 8/2017 | ............. G02B 7/021 |
| CN | 107925717 A | | 4/2018 | |
| CN | 207571384 U | | 7/2018 | |
| JP | 2000-116100 A | | 4/2000 | |
| JP | 2000-166212 A | | 6/2000 | |
| JP | 2010-39273 A | | 2/2010 | |
| JP | 2012-253820 A | | 12/2012 | |
| KR | 10-2005-0109647 A | | 11/2005 | |
| KR | 10-2007-0041933 A | | 4/2007 | |
| KR | 10-2010-0048246 A | | 5/2010 | |
| KR | 10-2011-0106664 A | | 9/2011 | |
| KR | 20140081275 A | * | 7/2014 | |
| KR | 20180012150 A | * | 2/2018 | ............... G02B 7/09 |
| WO | WO-2013121774 A1 | * | 8/2013 | ............ G02B 26/085 |

OTHER PUBLICATIONS

Machine translation of WO2013121774A (Year: 2013).*
Machine translation of KR20180012150A retrieved electronically from PE2E Search Oct. 31, 2024 (Year: 2024).*
Machine translation of CN206450888U retrieved electronically from PE2E Search Oct. 31, 2024 (Year: 2024).*

* cited by examiner

LENS ACTUATOR AND A CAMERA MODULE INCLUDING THE SAME

CROSS REFERENCE TO RELATED APPLICATIONS

This application is the National Phase of PCT International Application No. PCT/KR2019/009567, filed on Jul. 31, 2019, which claims priority under 35 U.S.C. 119(a) to Patent Application No. 10-2018-0090338, filed in the Republic of Korea on Aug. 2, 2018, all of which are hereby expressly incorporated by reference into the present application.

TECHNICAL FIELD

The embodiment relates to a lens actuator and a camera module including the same.

BACKGROUND ART

A camera module performs a function of photographing a subject and storing it as an image or video, and is mounted on a mobile terminal such as a mobile phone, a laptop computer, a drone, or a vehicle, etc.

On the other hand, portable devices such as smartphones, tablet PCs, and laptops have micro-camera modules built-in, and these camera modules automatically adjust the distance between the image sensor and the lens to align the focal length of the lens with an autofocus function.

Recently, camera modules can perform a zooming function of zooming up or zooming out, which increases or decreases the magnification of a distant subject through a zoom lens. There is an increasing demand for high magnification zooming that is more than twice that of recent camera module.

On the other hand, friction torque is generated when the lens is moved by mechanical movement using the lens actuator for the zooming function in the camera module, and there are technical problems in that this friction torque reduces driving force, increases power consumption, or decreases control characteristics.

In addition, in order to achieve the best optical characteristics in the camera module, the alignment between the lenses must be well matched. But when a decent which the spherical center between the lenses is deviated from the optical axis or a tilt which is a lens inclination phenomenon occurs, the angle of view changes or defocus occurs, which adversely affects the image quality and resolution.

However, in a camera module in related art, the lens housing moves within a predetermined stroke range by mechanical movement using a lens actuator for a zooming function, and is stopped by a stopper at the limit of the movement range and reversal of zoom movement may be possible.

However, in the related art, the impact of the lens mounted on the lens housing may occur due to the impact of the lens housing and the stopper. There is a technical problem in that this impact causes lens decent or lens tilt when the zoom movement is reversed.

In addition, technical problems such as damage to the stopper itself mounted on the lens housing, deterioration of the reliability of the magnet, and deterioration of control characteristics have occurred due to the impact of the lens housing and the stopper.

In addition, there is a problem in that it is difficult to implement a zooming function applied in a general large camera because there is a space limitation for zooming because the compact camera module has a size limitation. For example, as the height of a mobile phone becomes slim, there is a limitation on the thickness of the lens.

In addition, in the related art, the lens housing is driven by an electromagnetic force between a magnet disposed on the lens housing and a coil unit disposed on the base. Meanwhile, in the related art, a predetermined yoke is disposed on the rear side of the coil unit, so that the initial position of the lens housing can be controlled by the magnet and magnetic force.

However, in the related art, the yoke is mostly covered by the coil unit, and since the distance between the yoke and the magnet is at least exceeding the thickness of the coil unit, the magnetic force between the yoke and the magnet is weak.

On the other hand, the content described in the item merely provides background information on the embodiment and does not constitute a prior art.

DISCLOSURE

Technical Problem

One of the technical problems of the embodiment is to provide a lens actuator and a camera module including the same capable of reducing friction torque when a lens is moved through zooming in a camera module.

In addition, one of the technical problems of the embodiment is to provide a lens actuator and a camera module including the same capable of solving the problem that the lens decent or tilt of the lens mounted on the lens housing caused by the impact between the lens housing and the stopper.

In addition, one of the technical problems of the embodiment is to provide a lens actuator and a camera module including the same capable of solving problems such as a decrease in reliability of a magnet mounted on the lens housing, damage to the stopper itself, and a decrease in control characteristics due to the impact of the lens housing and the stopper.

In addition, one of the technical problems of the embodiment is to provide a lens actuator and a camera module including the same capable of smoothly performing a zooming function even in a very small and compact camera module.

In addition, one of the technical problems of the embodiment is to provide a lens actuator and a camera module including the same capable of solving the problem of weak magnetic force between a yoke and a magnet.

The technical problem of the embodiment is not limited to that described in this item, and includes what can be inferred from the entire description of the invention.

Technical Solution

The lens actuator according to the embodiment includes a base 20; a guide rail 210 coupled to the base 20; a first lens assembly 110 including a lens group and moving along the guide rail 210 in an optical axis direction: a first magnet 116 disposed on one side of the first lens assembly 110; a first coil unit 310 which is spaced apart from the first magnet 116 and disposed on the base 20.

The guide rail 210 may include a first stopper 216 of the first lens assembly on one side.

The first stopper 216 may limit movement of the first lens assembly.

The material of the first stopper 216 of the guide rail 210 may be different from the material of the base 20.

The material of the first stopper 216 of the guide rail 210 may include a metal material.

The first stopper may overlap the ball in a direction parallel to the optical axis direction.

The guide rail 210 may include a guide recess 214.

The embodiment may further include a ball 220 between the first lens assembly 110 and the guide rail 210.

The first lens assembly 110 includes a first lens housing 112 and a first driving unit housing 114, a first guide groove 114r at one side of the first driving unit housing 114, and the ball 220 disposed in the first guide groove 114r of the first driving unit housing 114.

The first coil unit 310 may include an inner coil unit 312; an outer coil unit 314 and a yoke 313 disposed between the inner coil unit 312 and the outer coil unit 314.

The embodiment may further include a guide pin 25 disposed on the base 20 in a direction parallel to the optical axis direction.

The first magnet 116 may simultaneously perform a driving magnet function and a position sensing magnet function.

Further, the camera module according to the embodiment may include any one of the lens actuators.

Advantageous Effects

According to the embodiment of the lens actuator and the camera module including the same, there is a technical effect of reducing frictional torque when the lens is moved through zooming in the camera module.

In addition, according to the embodiment, there is a technical effect of reducing the impact between the lens housing and the stopper, thereby solving the problem that the lens decent or the lens tilt occurs when the zoom movement is reversed.

Accordingly, according to the embodiment, there is a complex technical effect that can significantly improve image quality or resolution by preventing the occurrence of decent or tilt of the lens while minimizing friction torque during zooming.

In addition, according to the embodiment, there is a technical effect of reducing the impact between the lens housing and the stopper, thereby solving problems such as a decrease in reliability of a magnet mounted on the lens housing, damage to the stopper itself, and a decrease in control characteristics.

In addition, according to the embodiment, there is a technical effect that the zooming function can be smoothly performed even in a very small and compact camera module.

In addition, according to the embodiment, there is a technical effect capable of strengthening the magnetic force between the yoke and the magnet.

The technical effects of the embodiments are not limited to those described in this item, and include those that can be inferred from the entire description of the invention.

MODE FOR INVENTION

Hereinafter, embodiments will be described in detail with reference to the accompanying drawings.

On the other hand, in the description of the embodiment, in the case of being described as being formed in "top/bottom" or "up/down" of each element, "top/bottom" or "up/down" means that two components are in direct contact with each other, or that one or more other components are formed indirectly between the two components. In addition, when expressed as "top/bottom" or "up/down", the meaning of not only an upward direction but also a downward direction based on one configuration may be included.

In addition, relational terms such as "up/upper/above" and "low/lower/below" used hereinafter may not require or imply any physical or logical relationship or order between such components or elements. It may be used to distinguish one component or element from another component or element.

In addition, in the description of the embodiment, terms such as "first" and "second" may be used to describe various elements, but these terms are used for the purpose of distinguishing one element from other elements. In addition, terms specifically defined in consideration of the configuration and operation of the embodiment are only for describing the embodiment, and do not limit the scope of the embodiment.

EMBODIMENT

Figure 1:
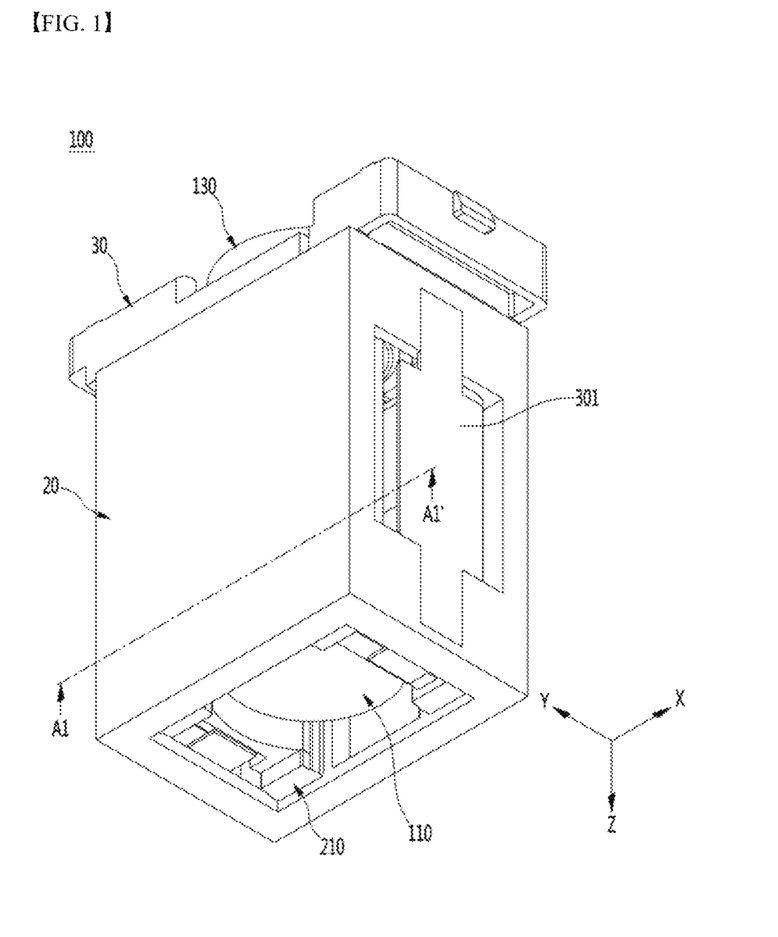
FIG. 1 is a perspective view of a camera module according to an embodiment.
Figure 2:
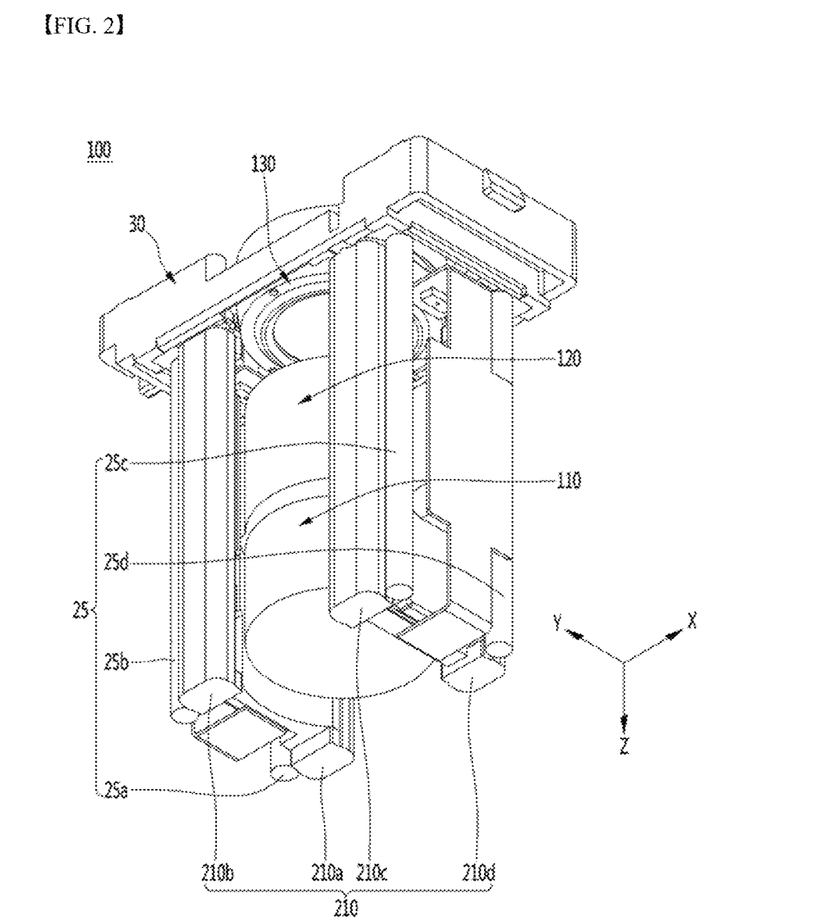
FIG. 2 is a perspective view with a base removed from the camera module according to the embodiment shown in FIG. 1.

FIG. 1 is a perspective view of a camera module 100 according to an embodiment, and FIG. 2 is a perspective view with a base 20 removed from the camera module according to the embodiment shown in FIG. 1.

Figure 3:
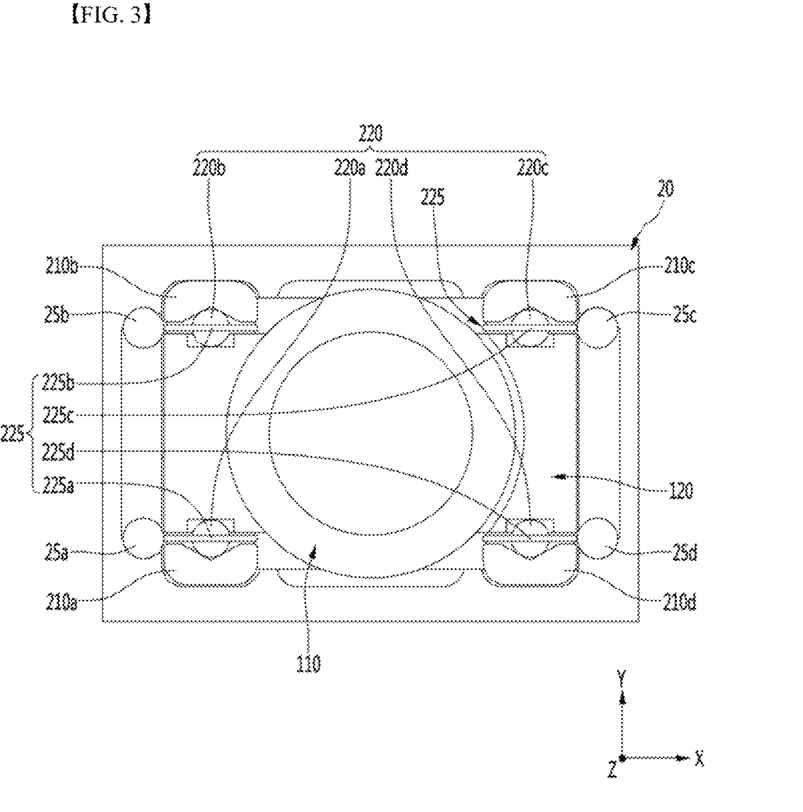
FIG. 3 is a cross-sectional view of the camera module according to the embodiment shown in FIG. 1.

Also, FIG. 3 is a cross-sectional view taken along line A1-A1' of the camera module 100 according to the embodiment shown in FIG. 1.

Figure 4:
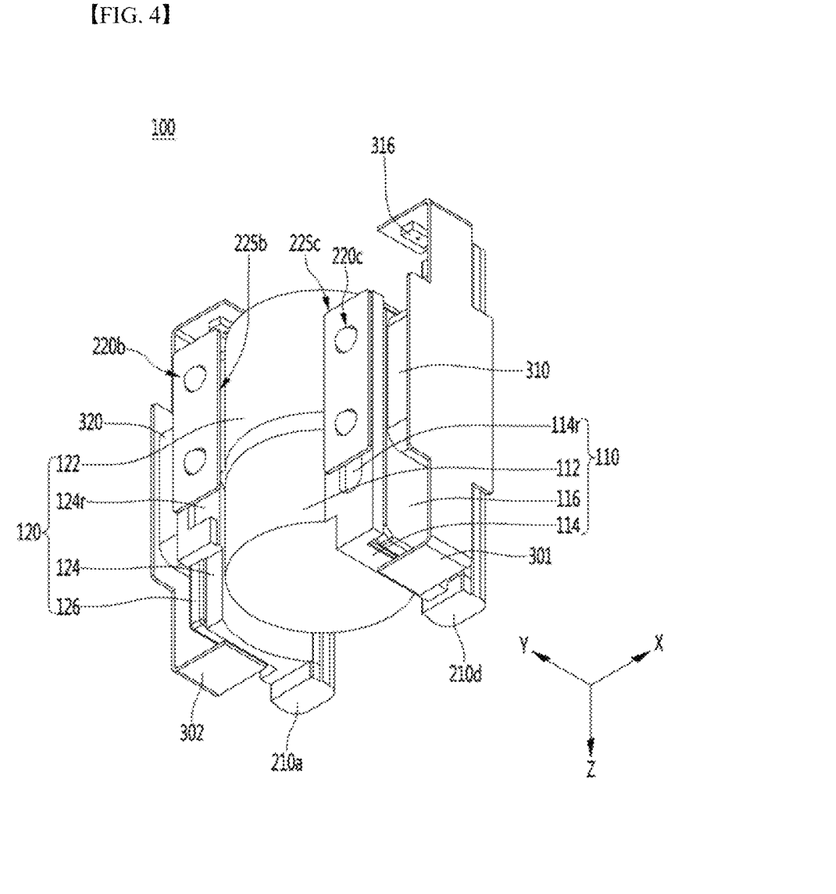
FIG. 4 is a perspective view of a camera module according to the embodiment shown in FIG. 3 with some components removed.

FIG. 4 is a perspective view of the camera module according to the embodiment shown in FIG. 3 with some components removed. For example, FIG. 4 is the perspective view in which a lens cover 30, a third lens group 130, a part of a guide rail 210 and a guide pin 25 are removed.

In the xyz axis direction shown in FIGS. 1 to 4, the xz plane represents the ground, the z-axis means an optical axis direction or a direction parallel thereto, and the x-axis may mean a direction perpendicular to the z-axis on the ground (xz plane) and the y-axis may mean a direction perpendicular to the ground.

Hereinafter, in the description of the embodiment, the case where there are two moving lens groups is described, but it is not limited thereto, and the number of moving lens groups may be three, four, or five or more.

For example, referring to FIG. 2, in the embodiment, the first lens assembly 110 and the second lens assembly 120 may be a moving lens group, and the third lens group 130 may be a fixed lens group. In addition, the optical axis direction z may mean a direction that is the same as or parallel to the direction in which the lens groups are aligned.

First, referring to FIGS. 1 and 2, the camera module 100 according to the embodiment includes various optical systems disposed on a predetermined base 20 such as a first lens assembly 110, a second lens assembly 120, and a third lens group 130. And one side of the base 20, for example, one side of the base 20 in the direction of the third lens group 130 may be coupled to the lens cover 30, and a predetermined image sensor unit (not shown) may be disposed on the other side of the base 20, for example, at the direction of the first lens assembly 110.

The lens cover 30 may be fitted with the base 20 in shape, or may be coupled by an adhesive. For example, a hook (not shown) may protrude from the side of the base 20, the lens cover 30 has a hole formed at a position corresponding to the hook, and the hook of the base 20 can be mounted in the hole of the lens cover 30 so that the lens cover 30 and the base 20 may be coupled. In addition, the lens cover 30 may be stably coupled to the base 20 by an adhesive.

The material of the base 20 may be formed of at least one of plastic, glass-based epoxy, polycarbonate, or composite material.

In an embodiment, the first lens assembly 110, the second lens assembly 120, and the third lens group 130 may be disposed parallel to the optical axis direction on the base 20. A first circuit board 301 disposed on the side of the base 20 and a second circuit board 302 (refer to FIG. 4) disposed on the other side of the base 20 are electrically connected to the lens driving units inside the base 20.

In an embodiment, a predetermined prism (not shown) may be disposed on the third lens group 130 side, and a predetermined image sensor unit (not shown) may be disposed on the first lens assembly 110 side.

The first lens assembly 110, the second lens assembly 120, the third lens group 130, the prism, and the image sensor unit may be classified as optical systems.

In an embodiment, the prism may change incident light into parallel light. For example, the prism changes the incident light into parallel light by changing the optical path of the incident light to an optical axis (z-axis) parallel to the central axis of the lens group. Thereafter, the parallel light may pass through the third lens group 130, the second lens assembly 120, and the first lens assembly 110 and enter the image sensor unit to capture an image.

The prism may be an optical member having a triangular column shape. In addition, in the embodiment, a reflective plate or a reflector may be used instead of or in addition to the prism.

In addition, in the embodiment, when the image sensor unit is not disposed in a direction perpendicular to the optical axis, an additional prism (not shown) may be provided so that light that has passed through the lens group is captured by the image sensor unit.

In an embodiment, the image sensor unit may be disposed perpendicular to the optical axis direction of parallel light. The image sensor unit may include a solid-state imaging device disposed on a predetermined third circuit board (not shown). For example, the image sensor unit may include a Charge Coupled Device (CCD) image sensor or a Complementary Metal-Oxide-Semiconductor (CMOS) image sensor.

Referring to FIGS. 1 and 2 together, in the embodiment, the first lens assembly 110 and the second lens assembly 120, which are moving lens groups, may be moved along the guide rail 210 in the optical axis direction.

For example, referring to FIG. 2, the camera module 100 according to the embodiment includes a base 20, a guide rail 210 coupled to the base 20, and a lens assembly including a lens group and moved in the optical axis direction along 210 along the guide rail, for example, a first lens assembly 110 and a second lens assembly 120.

The guide rail 210 may be disposed in plurality. For example, the guide rail 210 may include a first guide rail 210a, a second guide rail 210b, a third guide rail 210c, and a fourth guide rail 210d, but is limited thereto.

In addition, the embodiment may further include a guide pin 25 disposed in a direction parallel to the optical axis direction, and the guide pin 25 may be disposed on the base 20. For example, in the embodiment, a first guide pin 25a, a second guide pin 25b, a third guide pin 25c, and a fourth guide pin 25d are disposed parallel to the optical axis direction on the base 20, but it is not limited thereto.

The guide pin 25 may be formed of the same material as or similar to the material of the base 20. For example, the guide pin 25 may be formed of at least one of plastic, glass-based epoxy, polycarbonate, or a composite material, but it is not limited thereto.

When zooming, the guide pin 25 supports the first lens assembly 110 or the second lens assembly 120 from the side to prevent the occurrence of decent or tilt of the lens such that there is a technical effect of improving image quality or resolution.

Referring back to FIGS. 3 and 4, FIG. 3 is a cross-sectional view along line A1-A1' of the camera module 100 according to the embodiment shown in FIG. 1, and FIG. 4 is a perspective view in which the lens cover 30, the third lens group 130, the guide rail 210, and the guide pin 25 are removed from the camera module according to the embodiment shown in FIG. 3.

Hereinafter, technical features of the embodiment will be described in more detail with reference to FIGS. 3 and 4.

In the camera module 100 according to the embodiment, an optical system and a lens driver may be disposed on the base 20. For example, the camera module 100 according to the embodiment includes at least one of a first lens assembly 110, a second lens assembly 120, a third lens group 130, a first coil unit 310, a second coil unit 320, a guide rail 210, a rolling driving unit including a ball 220 and a ball guide 225, and a guide pin 50 disposed on the base 20.

For example, the camera module 100 according to the embodiment includes a base 20, a guide rail 210 coupled to the base 20, a first lens assembly 110, a second lens assembly 120 including a lens group and moving to an optical axis direction along the guide rail 210, a first magnet 116 on one side of the first lens assembly 110 and a first coil unit 310 disposed at base 29 spaced apart from the first magnet 116.

In an embodiment, the lens actuator may include a mover and a fixing part. The mover is a concept corresponding to a fixed part and may be referred to as a moving part. For example, the mover may mean a lens assembly that is moved through the guide rail 210. On the other hand, the fixed part may mean the base 20, the guide pin 25, the guide rail 210, the first coil unit 310, the second coil unit 320, and the like that are not moved.

The first coil unit 310, the second coil unit 320, and the guide rail 210 may be classified as a lens driving unit. Also, the first lens assembly 110 and the second lens assembly 120 can be function as a lens driving unit since the magnet 116 and the second magnet 126 are provided thereon. The first coil unit 310 and the second coil unit 320 may be a driving unit including a coil and a yoke, but are not limited thereto.

With continued reference to FIGS. 3 and 4, the camera module according to the embodiment may perform a zooming function. For example, in the embodiment, the first lens assembly 110 and the second lens assembly 120 can be moving lens that move through the first coil unit 310, the second coil unit 320 and the guide rail 210, and the third lens group 130 may be a fixed lens.

For example, in the embodiment, the first lens assembly 110 and the second lens assembly 120 may be a moving lens group, and the third lens group 130 may be a fixed lens group.

In this case, the third lens group 130 may perform a function of a focator for forming parallel light at a specific position.

Next, the second lens assembly 120 may perform a variable function of re-forming an image formed by the third lens group 130 as a concentrator to another location. Meanwhile, in the second lens assembly 120, the magnification change may be large due to the large change in the distance or the image distance to the subject, and the second lens assembly 120 as a variable factor can play an important role in the change in the focal length or magnification of the optical system.

On the other hand, the image of the second lens assembly 120 that is a variable factor may be slightly different depending on the location.

Accordingly, the first lens assembly 110 may perform a position compensation function for an image formed by the variable power. For example, the first lens assembly 110 may perform a function of a compensator that performs a role of accurately imaging a image point imaged by the second lens assembly 120, which is a variable factor, at an actual image sensor position.

Referring to FIG. 4, the first lens assembly 110 may include a first lens housing 112 and a first driving unit housing 114, and a predetermined lens (not shown) provided in the first lens housing 112, and a predetermined first magnet 116 disposed on the first driving unit housing 114.

In addition, the second lens assembly 120 may include a second lens housing 122 and a second driving unit housing 124, and the second lens housing 122 may include a predetermined lens (not shown). In addition, a predetermined second magnet 126 may be disposed on the second driving unit housing 124.

In the embodiment, the first lens assembly 110 and the second lens assembly 120 may be driven by electromagnetic force due to interaction with the first coil unit 310 and the second coil unit 320, respectively.

Figure 6:
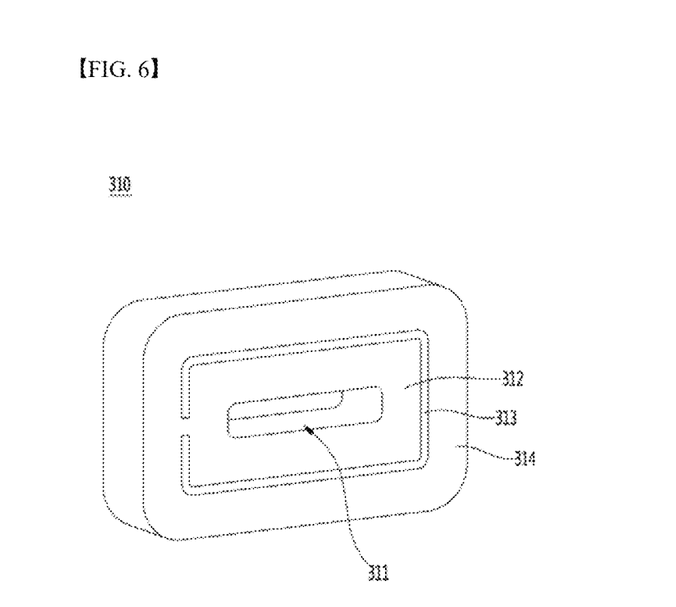
FIG. 6 is an enlarged perspective view of a coil unit in the camera module according to the embodiment shown in FIG. 4.

The first coil unit 310 and the second coil unit 320 may be a driving unit including a coil and a yoke (see FIG. 6). For example, the first coil unit 310 includes an inner coil unit 312, an outer coil unit 314, and a yoke 313 disposed between the inner coil unit 312 and the outer coil unit 314 which will be described in detail later.

Hereinafter, the first lens assembly 110 will be described with reference to FIG. 4.

Referring to FIG. 4, the first lens housing 112 of the first lens assembly 110 functions as a barrel or a body tube, and a first lens group (not shown) may be mounted. The first lens group may be a moving lens group, and may include a single lens or a plurality of lenses. The second lens assembly 120 may also include a second lens housing 122 and a second driving unit housing 124.

Next, a first magnet 116 may be disposed in the first driving unit housing 114 of the first lens assembly 110.

The first magnet 116 of the first lens assembly 110 may be a magnet driving unit, but it is not limited thereto. For example, the first magnet 116 may include a first magnet that is a permanent magnet. Also, the second coil unit 126 of the second lens assembly 120 may be a magnet driving unit, but it is not limited thereto.

In the camera module according to the embodiment, the magnetization method of the first magnet 116 may be a vertical magnetization method. For example, in the embodiment, both the N and S poles of the first magnet 116 may be magnetized to face the first coil unit 310. Accordingly, the N pole and S pole of the first magnet 116 may be disposed so as to correspond to a region in which current flows in the y-axis direction perpendicular to the ground in the first coil unit 310. The electromagnetic force between the first coil units 310 and the first magnet 116 may act to drive the first lens assembly 110, and the electromagnetic force may be controlled in proportion to the current applied to the first coil unit 314.

Likewise, electromagnetic force between the second magnet 126 and the second coil unit 320 is generated in the camera module according to the embodiment, so that the second lens assembly 120 may be moved horizontally with respect to the optical axis.

Referring back to FIGS. 3 and 4, the embodiment can be a rolling driving unit including a ball 220 and a ball guide 225 between the first, second lens assemblies 110, 120 and the guide rail 210. A driving unit may be provided to precisely guide the first lens assembly 110 and the second lens assembly 120 in parallel to the optical axis direction.

As described above, the guide rail 210 may be disposed in plurality. For example, the guide rail 210 may include a first guide rail 210a, a second guide rail 210b, a third guide rail 210c, and a fourth guide rail 210d, but is limited thereto.

In addition, the balls 220 may be disposed in plurality. For example, in the embodiment, the ball 220 may include a first ball 220a, a second ball 220b, a third ball 220c, and a fourth ball 220d, but it is not limited thereto.

In addition, the ball guide 225 may be disposed in plurality. For example, the ball guide 225 may include a first ball guide 225a, a second ball guide 225b, a third ball guide 225c, and a fourth ball guide 225d, but it is not limited thereto.

A plurality of balls 220 may be disposed in the ball guide 225, for example, two or more balls 220 may be disposed in any one ball guide 225, but this is not limited thereto.

In an embodiment, a first guide groove 114r may be provided on one side of the first driving unit housing 114 of the first lens assembly 110, and a second guide groove 124r may be provided on one side of the second driving unit housing 124 of the second lens assembly 120.

The ball 220 and the ball guide 225 may be disposed in the first guide groove 114r of the first driving unit housing 114 and the second guide groove 124r of the second driving unit housing 124, but it is not limited to thereto.

Through this, according to the embodiment, the first lens assembly 110 and the second lens assembly 120 can be moved by the guide rail 210 and the rolling driving unit, thereby minimizing mutual contact between the guide rail 210 and the ball 220 such that frictional resistance can be prevented. Accordingly, according to the embodiment, there is a technical effect such as improvement in driving force and reduction in power consumption by preventing the occurrence of friction torque during zooming.

Also, referring to FIG. 3, the embodiment may include a guide pin 25 disposed in a direction parallel to the optical axis direction, and the guide pin 25 may be disposed on the base 20. For example, in the embodiment, a first guide pin 25a, a second guide pin 25b, a third guide pin 25c, and a fourth guide pin 25d can be disposed parallel to the optical axis direction on the base 20, but it is not limited thereto.

The guide pin 25 may be formed of the same material as or similar to the material of the base 20. For example, the guide pin 25 may be formed of at least one of plastic, glass-based epoxy, polycarbonate, or a composite material, but it is not limited thereto.

The guide pin 25 may be formed separately from the base 20 and then coupled to the base 20 or may be formed by being injected simultaneously with the base 20.

According to an embodiment, when zooming, the guide pin 25 supports the first lens assembly 110 or the second lens assembly 120 from the side such that there is a technical effect that can improve image quality or resolution by preventing decent or lens tilt of the lens.

Referring to FIG. 4, the embodiment may include Hall sensors 316 on both sides of the first circuit board 301 and the second circuit board 302. Unlike the related art, the Hall sensor is not disposed inside the coil unit, as a result, interference between the Hall sensor and the coil unit can be prevented.

In addition, in the embodiment, the first magnet 116 and the second magnet 126 may function as a driving magnet and simultaneously perform a position sensing magnet function, so that a compact camera module can be provided.

Figure 5:
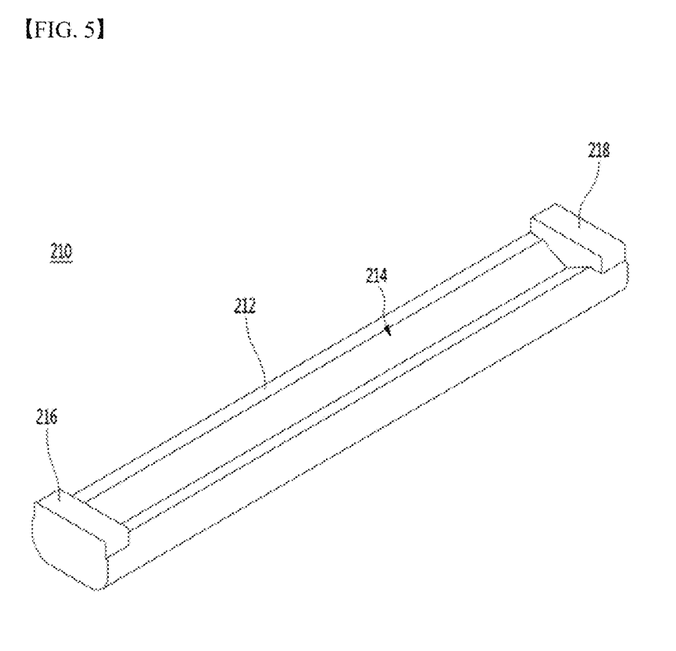
FIG. 5 is an enlarged perspective view of a guide rail in the camera module according to the embodiment shown in FIG. 4.

Next, FIG. 5 is an enlarged perspective view of the guide rail 210 in the camera module according to the embodiment shown in FIG. 4.

In an embodiment, the guide rail 210 may include a body 212 and a stopper of the lens assembly, for example, a first stopper 216 at one end of the body 212. In addition, in the embodiment, the guide rail 210 may include a second stopper 218 of the lens assembly at the other end of the body 212.

The material of the first stopper 216 and the second stopper 218 of the guide rail 210 may be different from the material of the base 20. For example, the material of the first stopper 216 and the second stopper 218 of the guide rail 210 may include a metal material such as Al.

In the embodiment, since the guide rail 210 is formed of a metal material, the surface roughness is excellent, and thus there is a technical effect of reducing frictional torque resistance. In addition, the processing direction of the guide rail 210 is parallel to the optical axis, so that friction torque when the lens assembly is moved may be further reduced.

In particular, as described above, in a conventional camera module, the lens housing moves within a predetermined stroke range by mechanical movement using a lens actuator for a zooming function and the zoom movement can be reversed.

However, in the related art, the impact of the lens mounted on the lens housing may occur due to the impact between the lens housing and the stopper. There is a technical problem in that this impact causes lens decent or lens tilt when the zoom movement is reversed.

In addition, technical problems such as a decrease in reliability of a magnet mounted on a lens housing, damage to the stopper itself, and a decrease in control characteristics are caused by the impact of the lens housing and the stopper.

In order to solve this technical problem, in the embodiment, the material of the first stopper 216 and the second stopper 218 may be formed of the same metal material as the material of the guide rail 210.

On the other hand, in the related art, the stopper is formed on the base and the stopper material is formed of polycarbonate or the like, so that there is a problem of low impact absorption.

On the other hand, in the embodiment, stoppers are formed at both ends of the guide rail 210 to more precisely control the movement and stopping of the lens assembly. And the first stopper 216 and the second stopper 218 of the guide rail 210 can be formed of the material of a metal material such as Al, the impact absorption power can be improved, and the impact between the lens housing and the stopper can be reduced. Through this, the embodiment has a technical effect of solving a problem that a lens decent or a lens tilt occurs when the zoom movement is reversed.

According to the embodiment, when zooming, the guide rail is formed of a metal material with excellent surface roughness such as Al, so that friction torque can be minimized. By forming a material, there is a complex technical effect that can significantly improve image quality or resolution by preventing the occurrence of decent or tilt of the lens.

In addition, according to the embodiment, there is a technical effect of reducing the impact between the lens housing and the stopper, thereby solving problems such as a decrease in reliability of a magnet mounted on the lens housing, damage to the stopper itself, and a decrease in control characteristics.

In addition, in an embodiment, the guide rail 210 may include a guide recess 214.

Referring to FIGS. 5 and 3, the cross section of the guide recess 214 may have a triangular shape, and accordingly, the ball 220 has a technical effect of minimizing friction torque by making three-point contact. For example, the ball 220 can be in two-point contact with the guide recess 214 having a triangular cross section, and the ball 220 can be in one-point contact with the first guide groove 114r of the first driving unit housing 114 or the second guide groove 124r of the second driving unit housing 124 (refer to FIG. 4) such that a total of three points are contacted to minimize friction torque.

Through this, according to the lens actuator and the camera module including the same of the embodiment, there is a technical effect of reducing frictional torque when the lens is moved through zooming in the camera module.

In addition, according to the embodiment, since the ball 220 can be in two-point contact with the guide recess 214, and can be in one-point contact with the first guide groove 114r of the first driving unit housing 114 or the second guide groove 124r of the second driving unit housing 124, the first driving unit housing 114 and the second driving unit housing 124 can be guided stably, so that there is a technical effect that the lens decenter or lens tilt can prevented when the lens is moved through zooming in the camera module.

Next, FIG. 6 is an enlarged perspective view of a coil unit, for example, the first coil unit 310 in the camera module according to the embodiment shown in FIG. 4.

Figure 7A:
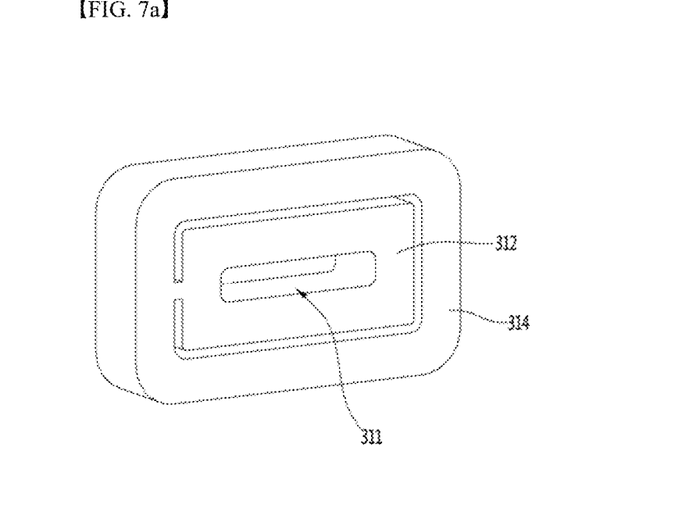
FIGS. 7A and 7B are exploded views of a coil unit in the camera module according to the embodiment shown in FIG. 6.
Figure 7B:
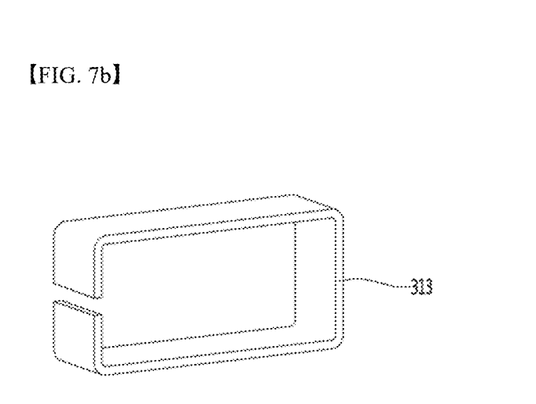

FIGS. 7A and 7B are exploded views of the first coil unit 310 in the camera module according to the exemplary embodiment illustrated in FIG. 6. For example, FIG. 7B is a perspective view of the first yoke 313 in the first coil unit 310 of the camera module according to the embodiment shown in FIG. 6, and FIG. 7A is a perspective view with the first yoke 313 removed from the first coil unit 310 of the camera module according to the embodiment shown in FIG. 6.

The first coil unit 310 of the camera module according to the embodiment may have a structure in which a yoke is disposed in a coil. For example, the first coil unit 310 of the camera module according to the embodiment may include an inner coil unit 312, an outer coil unit 314, and a yoke 313 disposed between the inner coil unit 312 and the outer coil unit 314.

According to the embodiment, the thickness of the yoke 313 and the thickness of the inner coil unit 312 and the outer coil unit 314 may be the same, but are not limited thereto.

According to the embodiment, the inner coil unit 312 may be wound around a predetermined first jig (not shown), and then the inner coil unit 312 may be wrapped with a yoke 313. After the first jig is removed, the outer coil unit 314 may be wound using the yoke 313 as a second jig, but the winding method is not limited thereto.

Accordingly, according to the embodiment, the yoke 313 is disposed in the coil and the size of the coil unit can be reduced by performing a jig function, and through this, there is a technical effect in that the zooming function can be smoothly performed even in a compact camera module.

Figure 8A:
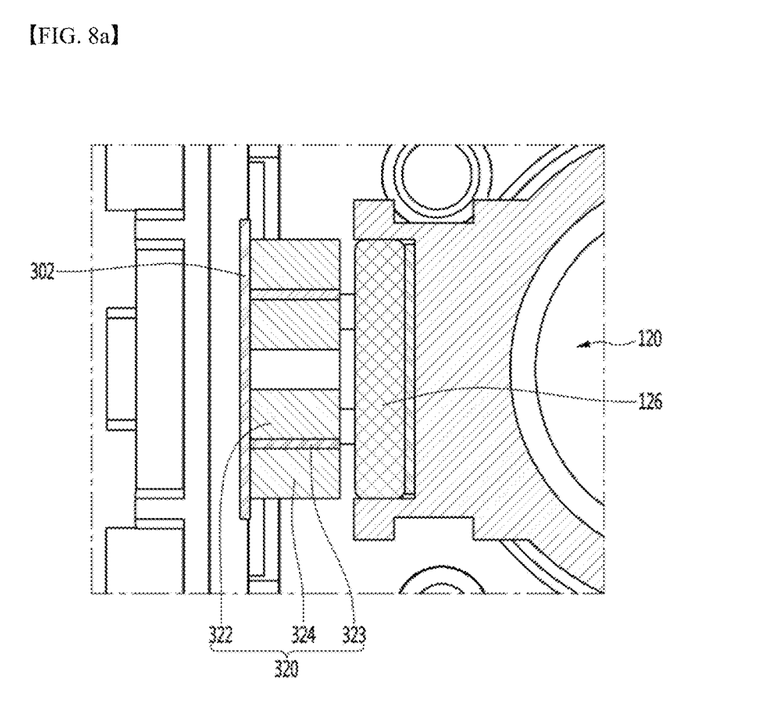
FIG. 8A is a partial cross-sectional view of a camera module according to an embodiment.
Figure 8B:
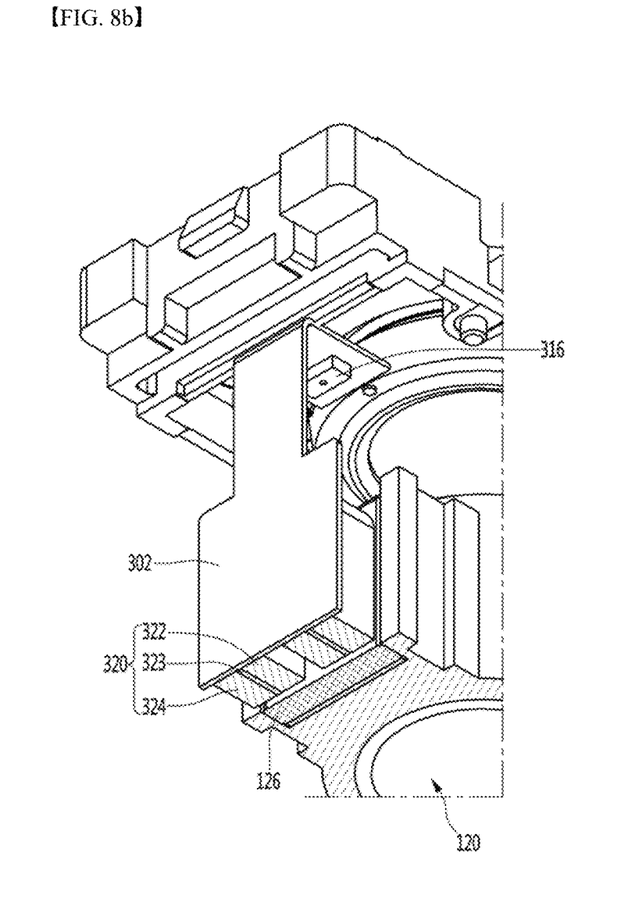
FIG. 8B is a partial perspective view of the camera module according to the embodiment.

Next, FIG. 8A is a partial cross-sectional view of the camera module according to the embodiment, and FIG. 8B is a partial perspective view of the camera module according to the embodiment.

Referring to FIGS. 8A and 8B, the second coil unit 320 of the camera module 100 according to the embodiment may be disposed on the second circuit board 302 and may be disposed adjacent to the magnet 126.

According to an embodiment, a yoke may be arranged in a coil. For example, the second coil unit 320 includes a second inner coil unit 322, a second outer coil unit 324, and a second yoke 323 disposed between the inner coil unit 322 and the second outer coil unit 324. Also, as shown in FIG. 8B, a Hall sensor 316 may be disposed on the second circuit board 302.

Figure 9:
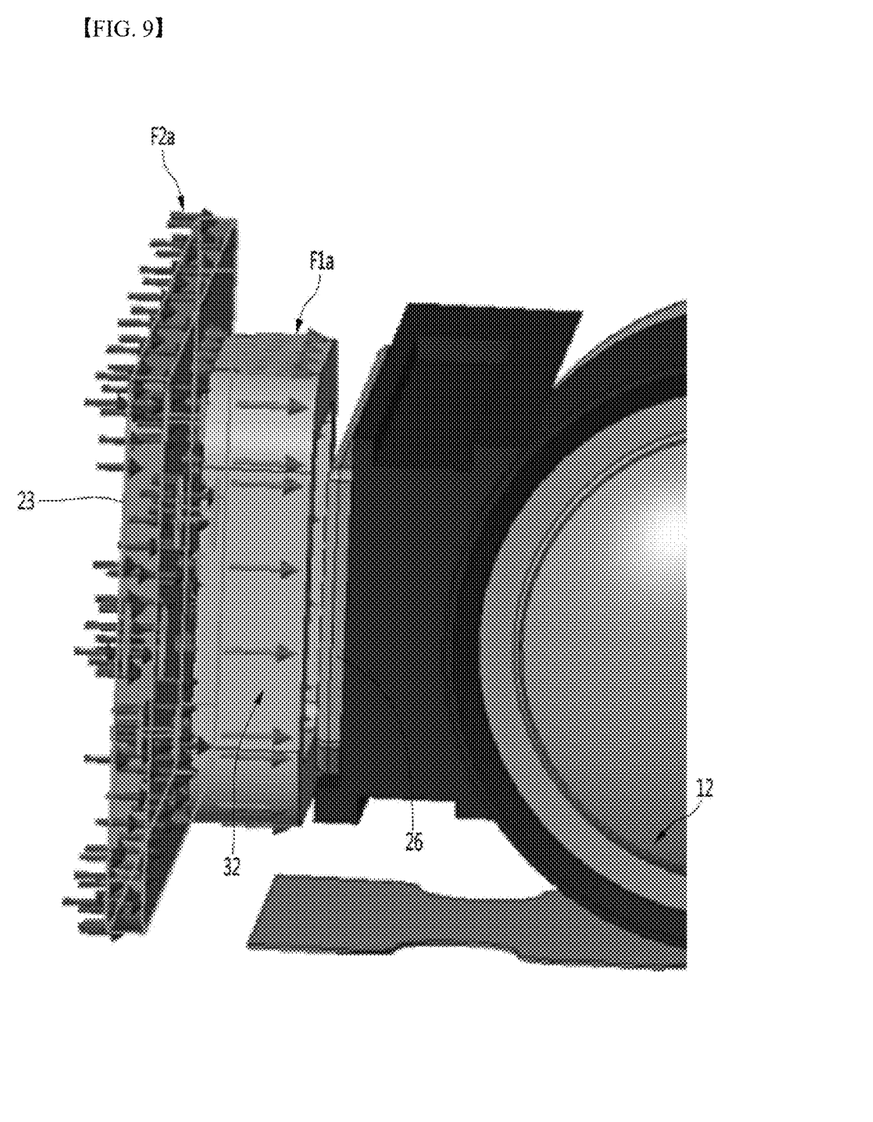
FIG. 9 is an exemplary diagram illustrating a relationship between a coil unit and a magnet in a camera module according to a comparative example.

FIG. 9 is a diagram illustrating a relationship between the coil unit 32 and the magnet 26 in the camera module according to the comparative example.

Figure 10:
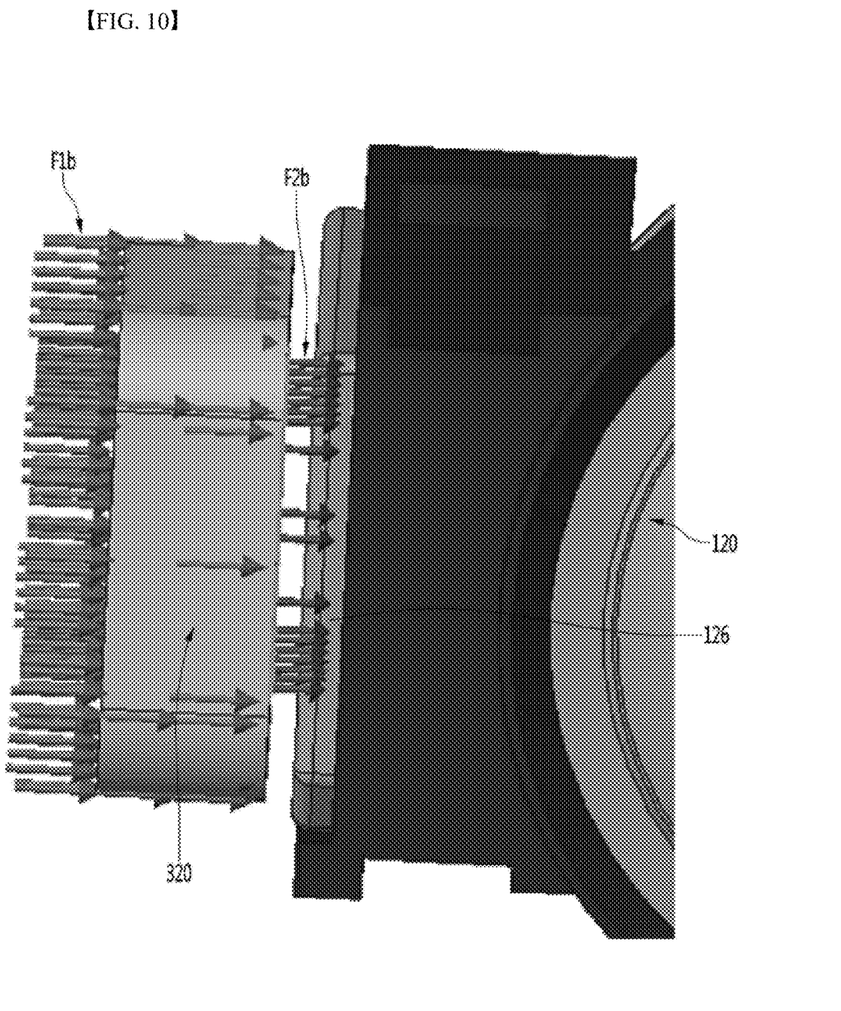
FIG. 10 is an exemplary diagram illustrating a relationship between a coil unit and a magnet in a camera module according to an embodiment.

On the other hand, FIG. 10 is a diagram illustrating a relationship between the second coil unit 320 and the second magnet 126 in the camera module according to the embodiment.

Referring to FIG. 9, in a comparative example, the lens assembly 12 may be driven by the electromagnetic force F1a between the coil unit 32 and the magnet 26.

At this time, in the comparative example, as the yoke 23 is disposed on the rear side (opposite of the magnet) of the coil unit 32, there is a problem in that the magnetic force F2a between the yoke 23 and the magnet 26 is weak.

For example, in the comparative example, the yoke 23 is mostly covered by the coil unit 32, and since the distance between the yoke 23 and the magnet 26 is at least exceeding the thickness of the coil unit 32, there is a problem that the magnetic force F2a between the yoke 23 and the magnet 26 is weak.

On the other hand, in the embodiment as shown in FIG. 10, the second lens assembly 120 may be driven by the electromagnetic force F1b between the second coil unit 320 and the second magnet 126.

At this time, as shown in FIGS. 8A and 8B, in the embodiment, as the second yoke 313 is disposed in the second coil unit 320, there is a technical effect in that the magnetic force F2b between the second yoke 323 and the second magnet 126 can be very improved.

For example, in the embodiment, as the second yoke 323 is disposed in the second coil unit 320, there is the technical effect in that covering issue of the magnetic force between the second yoke and the second magnet by coil or interference issue between the coil and the magnetic force can be excluded. Also, there is a technical effect in that the distance between the second yoke 323 and the second magnet 126 can be arranged very close, so that the magnetic force F2b can be greatly increased.

According to the lens actuator and the camera module including the same of the embodiment, there is a technical effect of reducing frictional torque when the lens is moved through zooming in the camera module.

In addition, according to the embodiment, there is a technical effect of reducing the impact between the lens housing and the stopper, thereby solving a problem that a lens decent or a lens tilt occurs when a zoom movement is reversed.

In addition, according to the embodiment, there is a complex technical effect that can significantly improve image quality or resolution by preventing the occurrence of decent or tilt of the lens while minimizing friction torque during zooming.

In addition, according to the embodiment, there is a technical effect of reducing the impact between the lens housing and the stopper, thereby solving problems such as a decrease in reliability of a magnet mounted on the lens housing, damage to the stopper itself, and a decrease in control characteristics.

In addition, according to the embodiment, there is a technical effect that the zooming function can be smoothly performed even in a very small and compact camera module.

In addition, according to the embodiment, there is a technical effect capable of strengthening the magnetic force between the yoke and the magnet.

Features, structures, effects, and the like described in the above embodiments are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

INDUSTRIAL APPLICABILITY

The camera module according to the embodiment may be mounted and used in a mobile terminal, a laptop computer, a drone, a vehicle, or the like.

The invention claimed is:

1. A lens actuator, comprising:
a base;
a first guide rail disposed within the base;
a second guide rail disposed within the base;
a first lens assembly configured to move in an optical axis direction along the first guide rail;
a second lens assembly configure to move in the optical axis direction along the second guide rail;
a first magnet disposed on one side of the first lens assembly;
a first coil unit spaced apart from the first magnet and disposed within the base; and
a first ball disposed between the first lens assembly and the first guide rail,
wherein the first guide rail includes a first guide recess configured to accommodate the first ball and a first stopper at an end of the first guide recess configured to limit movement of the first lens assembly,
wherein the first guide recess is configured to extend parallel to the optical axis,
wherein a length of the first guide recess along the optical axis direction is greater than a length of the first lens assembly,
wherein the first and second lens assemblies are sequentially arranged in the optical axis direction, and
wherein the first guide rail and the second guide rail are diagonally disposed within the base with respect to the optical axis.

2. The lens actuator according to claim 1, further comprising:
a second magnet disposed on one side of the second lens assembly;
a second coil unit spaced apart from the second magnet and disposed within the base; and
a second ball disposed between the second lens assembly and the second guide rail,
wherein the second guide rail comprises a second guide recess configured to accommodate the second ball and a second stopper at an end of the second guide recess configured to limit movement of the second lens assembly.

3. The lens actuator according to claim 2, wherein the base comprises first and second side surfaces facing each other, and third and fourth side surfaces facing each other, a first corner where the first side surface and the third side surface meet, and a second corner where the second side surface and the fourth side surface meets, and
wherein the first guide rail is disposed at the first corner, and the second guide rail is disposed at the second corner.

4. The lens actuator according to claim 2, further comprising:
a third guide rail and a fourth guide rail disposed within the base, each of the third guide rail and the fourth guide rail having a flat surface;
a third ball disposed between the third guide rail and the first lens assembly; and
a fourth ball disposed between the fourth guide rail and the second lens assembly.

5. The lens actuator according to claim 4, wherein the third guide rail comprises a third stopper configured to limit movement of the first lens assembly, and
wherein the fourth guide rail comprises a fourth stopper configured to limit movement of the second lens assembly.

6. The lens actuator according to claim 2, wherein the first lens assembly comprises a first lens housing accommodating a first lens and a first extension portion extending from the first lens housing in the optical axis direction, and
wherein at least a portion of the first magnet is disposed on the first extension portion.

7. The lens actuator according to claim 6, wherein at least a portion of the second magnet is configured to overlap the first extension portion in a direction perpendicular to the optical axis direction.

8. The lens actuator according to claim 6, wherein the second lens assembly comprises a second lens housing accommodating a second lens and a second extension portion extending from the second lens housing in the optical axis direction,
wherein at least a portion of the second magnet is disposed on the second extension portion,
wherein the first lens housing and the second lens housing are configured to overlap in the optical axis direction, and
wherein the second extension portion is configured to overlap at least a portion of the first magnet in a direction perpendicular to the optical axis direction.

9. The lens actuator according to claim 1, wherein the first magnet is configured to simultaneously perform a driving magnet function and a position sensing magnet function.

10. A camera module including the lens actuator of claim 1.

11. A lens actuator, comprising:
a base;
a first guide rail disposed within the base;
a second guide rail disposed within the base;
a first lens assembly configured to move in an optical axis direction along the first guide rail;
a second lens assembly configure to move in the optical axis direction along the second guide rail;
a first magnet disposed on one side of the first lens assembly;
a first coil unit spaced apart from the first magnet and disposed within the base;
a first ball disposed between the first lens assembly and the first guide rail; and
a guide pin disposed on the base in a direction parallel to the optical axis direction,
wherein the first guide rail includes a first guide recess configured to accommodate the first ball and a first stopper at an end of the first guide recess configured to limit movement of the first lens assembly,
wherein the first and second lens assemblies are sequentially arranged in the optical axis direction, and
wherein the first guide rail and the second guide rail are diagonally disposed within the base with respect to the optical axis.

* * * * *